UNITED STATES PATENT OFFICE.

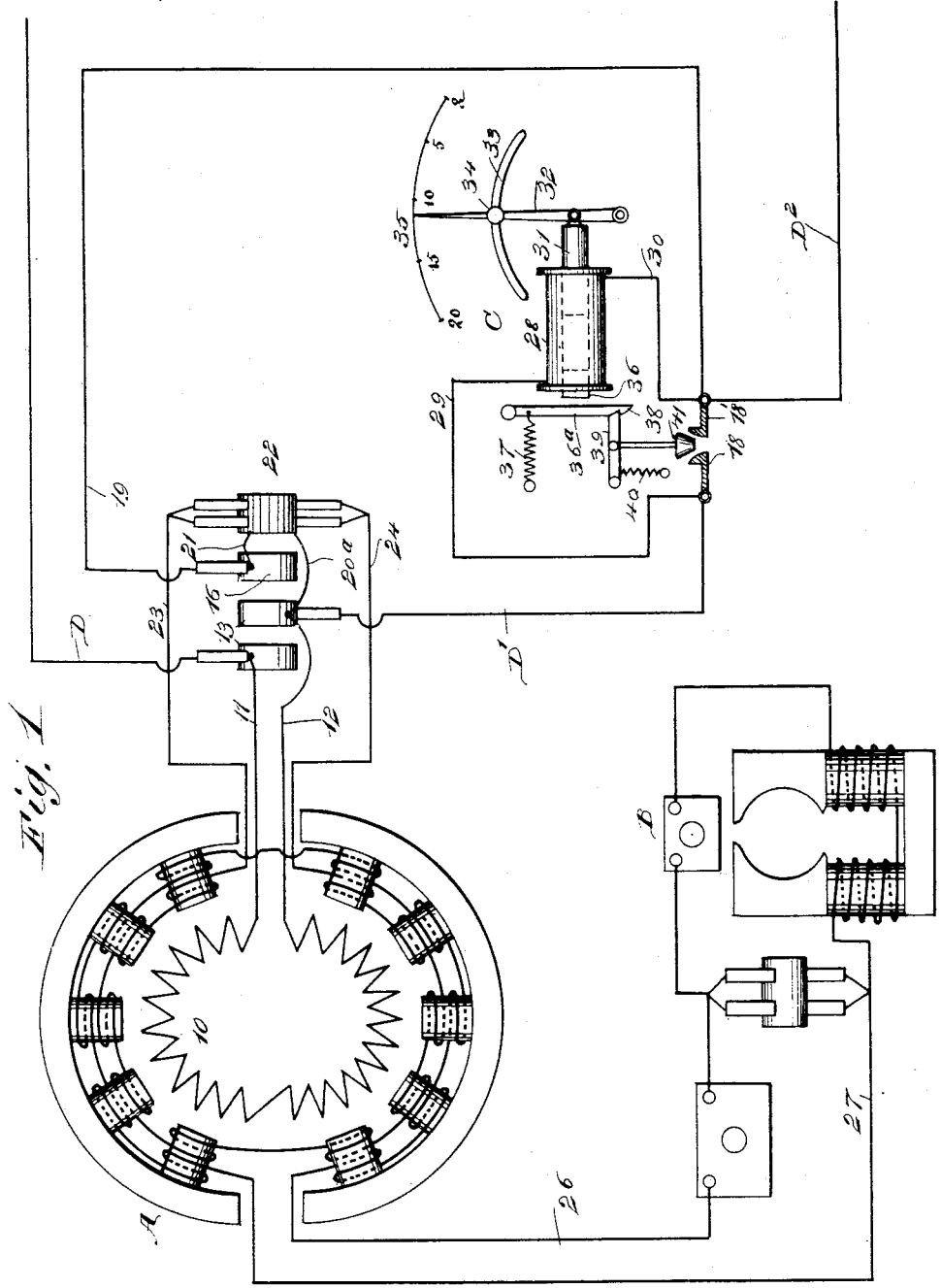

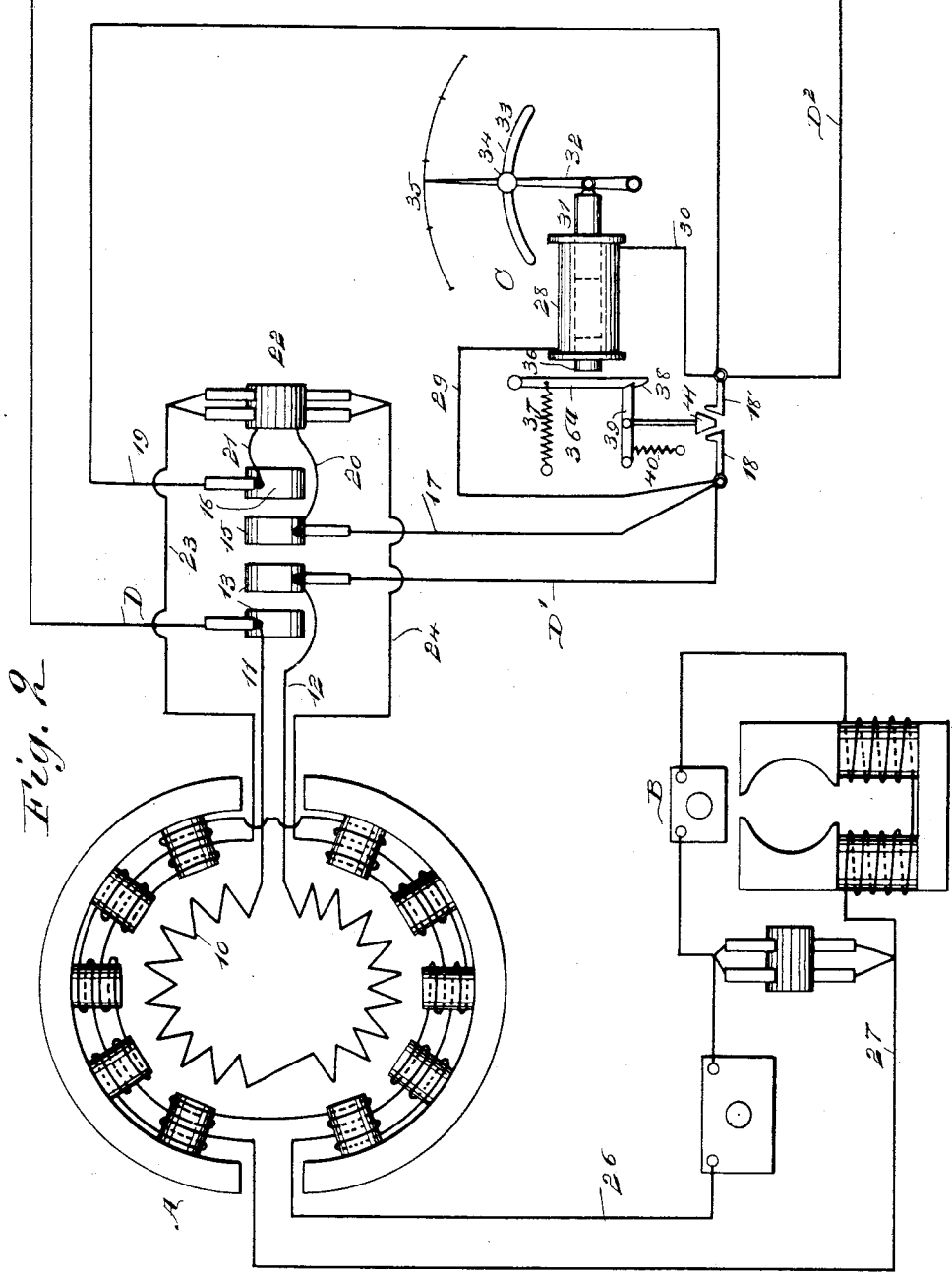

JOHN D. HILLIARD, JR., OF BLUEFIELD, WEST VIRGINIA.

COMPOUND-WOUND ALTERNATING GENERATOR.

SPECIFICATION forming part of Letters Patent No. 541,357, dated June 18, 1895.

Application filed June 21, 1894. Serial No. 515,261. (No model.)

*To all whom it may concern:*

Be it known that I, JOHN D. HILLIARD, Jr., of Bluefield, in the county of Mercer and State of West Virginia, have invented a new and Improved Regulator for Electric Generators, of which the following is a full, clear, and exact description.

My invention relates to an improved means of compounding and regulating the voltage of the current of alternating current electric generators; and the object of my invention is to produce a simple means of regulating and compounding such current, which means provides for close regulation and high efficiency, which enables the percentage of compounding to be easily changed and controlled, which prevents the opening of the circuit of the machine by the breaking of the series coils, and which sends a part, preferably the larger part, of the main current from the generator, through a commutator and directly to the compound series winding on the generator fields, the amount of the said current in the fields being regulated by a self-inductive resistance which is placed in the circuit.

In utilizing my invention I have two windings on the field spools of the generator, one of which is furnished with a constant current from a separate exciter, and the other with a variable current supplied by the generator itself and varied with the variation of the load of the generator. The regulation of the voltage of the current by my method is very quick and efficient, as there is but one magnetic field to vary, and this variation is accomplished in a simple manner as will appear from the description to follow.

To these ends my invention consists of a means of regulating and compounding the voltage of the current of an electric generator, which means will be hereinafter fully set forth and claimed.

Reference is to be had to the accompanying drawings, forming a part of this specification, in which similar figures and letters of reference indicate corresponding parts in both the views.

Figure 1 is a diagrammatic view illustrating the arrangement of my improved regulating device; and Fig. 2 is a similar view, but showing a slight modification of the circuit.

The dynamo A may be of any ordinary type, and it is connected with a separate exciter B and with a self-inductive regulator C, the connections between the several parts being as hereinafter described.

The dynamo A has the armature winding 10 connected by wires 11 and 12 with collectors 13 on the armature shaft, one of these being connected directly with the line wire D and the other with the line wires D', D². The armature shaft is also provided with collectors 15 and 16, as illustrated in Fig. 2, though the collector 15 may be dispensed with, as in Fig. 1, this latter arrangement being preferable. When both collectors are used, a wire 17 leads from the collector 15 to one of the contacts 18 in the line wires D', D², and a wire 19 leads from the collector 16 to the opposite contact 18' in the said line. The collectors 15 and 16 are also connected by wires 20 and 21 with a commutator 22, but in the preferred arrangement shown in Fig. 1, the wire 17 is omitted and a wire 20ª connects one of the collectors 13 with the commutator or rectifying device 22, and the current passes from the said rectifying device to the wires 23 and 24 to the series field winding of the generator. The separately excited field winding of the generator is connected with the self-exciter by wires 26 and 27.

The self-inductive regulator C consists essentially of a resistance coil 28, which connects by a wire 29 with one of the contacts 18 and by a wire 30 with the other contact 18', and this coil has extending into it a movable core 31 by which the self induction of the coil is regulated and the percentage of compounding controlled, this core being pivoted to a hand 32 which moves over a segment 33 to which it may be secured by a screw 34 and the hand also moves over the graduated scale 35 which is arranged to indicate the percentage of compounding.

The coil 28 has in one end a fixed core 36, opposite which is a swinging armature 36ª which is held away from the core by a spring 37, and has at its lower end a shoulder 38 to engage the free end of a latch 39, which is normally depressed by a spring 40 and carries a contact 41, adapted to enter between the contacts 18 and 18' and so short circuit the coil when the series circuit of the field is open, and thus prevent the coil from being burned out, it also permitting the generator to be run as a separately excited machine.

The core 31 is adjusted to the desired degree and when the dynamo is in operation the current passes from one of the collectors 13 through the wire D, the wire $D^2$, the wire 30, the coil 28, the wire 29 and the wire D' back to the other collector. A part of the current also passes from the commutator 22 through the wires 23 and 24 and the series coils of the field of the dynamo.

When the main circuit of the machine is open there is no flowing of current in the series coils, but as the load is put on the generator, the self-induction of the coil 28 regulates the current flowing through the shunt wires and therefore through the series winding on the generator. If the circuit 23, 24 is open or the current through the coil unduly increased, the armature $36^a$ is drawn against the tension of the spring 37 so as to release the latch 39 and permit the contact 41 to drop into contact with the contacts 18 and 18', thereby short circuiting the coil and preventing it from being burned out.

For proper working of the device, both the core, 31, and field magnets of generator should not be fully saturated.

The co-efficient of self-induction of the coil, 28, is nearly a constant up to the point of saturation of its core, 31, and the current divides in a given constant ratio for all loads.

Having thus described my invention, I claim as new and desire to secure by Letters Patent—

1. The herein-described method of compounding and regulating the current of an alternating current generator, which consists in shunting a part of the main current of the generator through a rectifying or commutating device and through the series winding of the field of the generator, arranging a variable inductive resistance in the shunt circuit, and providing an automatic cut-out actuated by the increase of current in the resistance to short circuit the said resistance.

2. The combination, with the alternating current generator, the commutator arranged in a shunt circuit from the generator and in circuit with the series winding of the field of the generator, the variable resistance coil arranged in said shunt circuit, the armature actuated by the said coil, a latch held by the armature, and a circuit closer operated by the latch and adapted to short circuit the coil, substantially as described.

JOHN D. HILLIARD, Jr.

Witnesses:
  Wm. A. Cather,
  James McGorvin.